United States Patent
de Rijk et al.

(10) Patent No.: US 11,031,669 B2
(45) Date of Patent: Jun. 8, 2021

(54) METHOD OF ADDITIVE MANUFACTURE OF A WAVEGUIDE AS WELL AS WAVEGUIDE DEVICES MANUFACTURED ACCORDING TO THIS METHOD

(71) Applicant: SWISSto12 SA, Ecublens (CH)

(72) Inventors: Emile de Rijk, Lausanne (CH); Mirko Favre, Cully (CH); Mathieu Billod, Presilly (FR); Alexandre Dimitriades, Nyon (CH); Alessandro Macor

(73) Assignee: SWISSTO12 SA, Renens VD (CH)

( * ) Notice: Subject to any disclaimer, the term of this patent is extended or adjusted under 35 U.S.C. 154(b) by 338 days.

(21) Appl. No.: 16/082,060

(22) PCT Filed: Feb. 24, 2017

(86) PCT No.: PCT/IB2017/051086
§ 371 (c)(1),
(2) Date: Sep. 4, 2018

(87) PCT Pub. No.: WO2017/149423
PCT Pub. Date: Sep. 8, 2017

(65) Prior Publication Data
US 2020/0161738 A1    May 21, 2020

(30) Foreign Application Priority Data

Mar. 4, 2016 (FR) ...................... 16/00370

(51) Int. Cl.
*H01P 11/00* (2006.01)
*B33Y 10/00* (2015.01)
(Continued)

(52) U.S. Cl.
CPC ............ *H01P 11/002* (2013.01); *B33Y 10/00* (2014.12); *B33Y 80/00* (2014.12); *H01P 3/123* (2013.01); *Y10T 29/49016* (2015.01)

(58) Field of Classification Search
CPC ...... H01P 3/123; H01P 11/001; H01P 11/002; H01P 11/006; B33Y 10/00; H01Q 1/38; H01Q 21/064; Y10T 29/49016
See application file for complete search history.

(56) References Cited

U.S. PATENT DOCUMENTS 3,982,215 A * 9/1976 Lo .......................... H01P 1/208
                                                             333/208
6,265,703 B1    7/2001 Alton
(Continued)

FOREIGN PATENT DOCUMENTS

CN           104733825 A      6/2015

OTHER PUBLICATIONS

International Search Report for PCT/IB2017/051086 dated May 22, 2017.
(Continued)

*Primary Examiner* — Peter Dungba Vo
*Assistant Examiner* — Joshua D Anderson
(74) *Attorney, Agent, or Firm* — Pearne & Gordon LLP

(57) ABSTRACT

A method for producing a waveguide device, including producing a core of a non-conductive material. The core has side walls with outer surfaces and inner surfaces, the inner surfaces defining a waveguide channel. A layer of conductive metal is deposited on the inner surfaces by immersion in a fluid of reactants. The core includes at least one hole between the outer and inner surfaces, specifically used to encourage the removal of bubbles from the channel and/or the circulation of the fluid during the immersion.

13 Claims, 12 Drawing Sheets

(51) Int. Cl.
*B33Y 80/00* (2015.01)
*H01P 3/123* (2006.01)

(56) References Cited

U.S. PATENT DOCUMENTS

2012/0084968 A1    4/2012  Nath et al.
2018/0301820 A1*  10/2018  Bregman ............... H01Q 13/10

OTHER PUBLICATIONS

Huang, Yilei, et al., "Layer-by-Layer Stereolithography of Three-Dimensional Antennas", Antennas and Propagation Society Symposium, 2005. IEEE Washington, DC, Jul. 3-8, 2005, Pisacataway, NJ : IEEE, US, vol. 1A, Jul. 3, 2005, p. 276-279.
Boryssenko, Anatoliy, et al. "300 GHz Microfabricated Waveguide Slotted Arrays", 2014 39th International Conference on Infrared, Millimeter, and Terahertz Waves (IRMMW-THZ), IEEE, Sep. 14, 2014, pp. 1-2.
Rowen, Adam, et al. "Multi-layer metal micromachining for THz waveguide fabrication", Proc. of Spie, vol. 7590, Feb. 16, 2010.
Translation of Office Action for corresponding Chinese application No. 201780014717.3 dated Jun. 1, 2020.

* cited by examiner

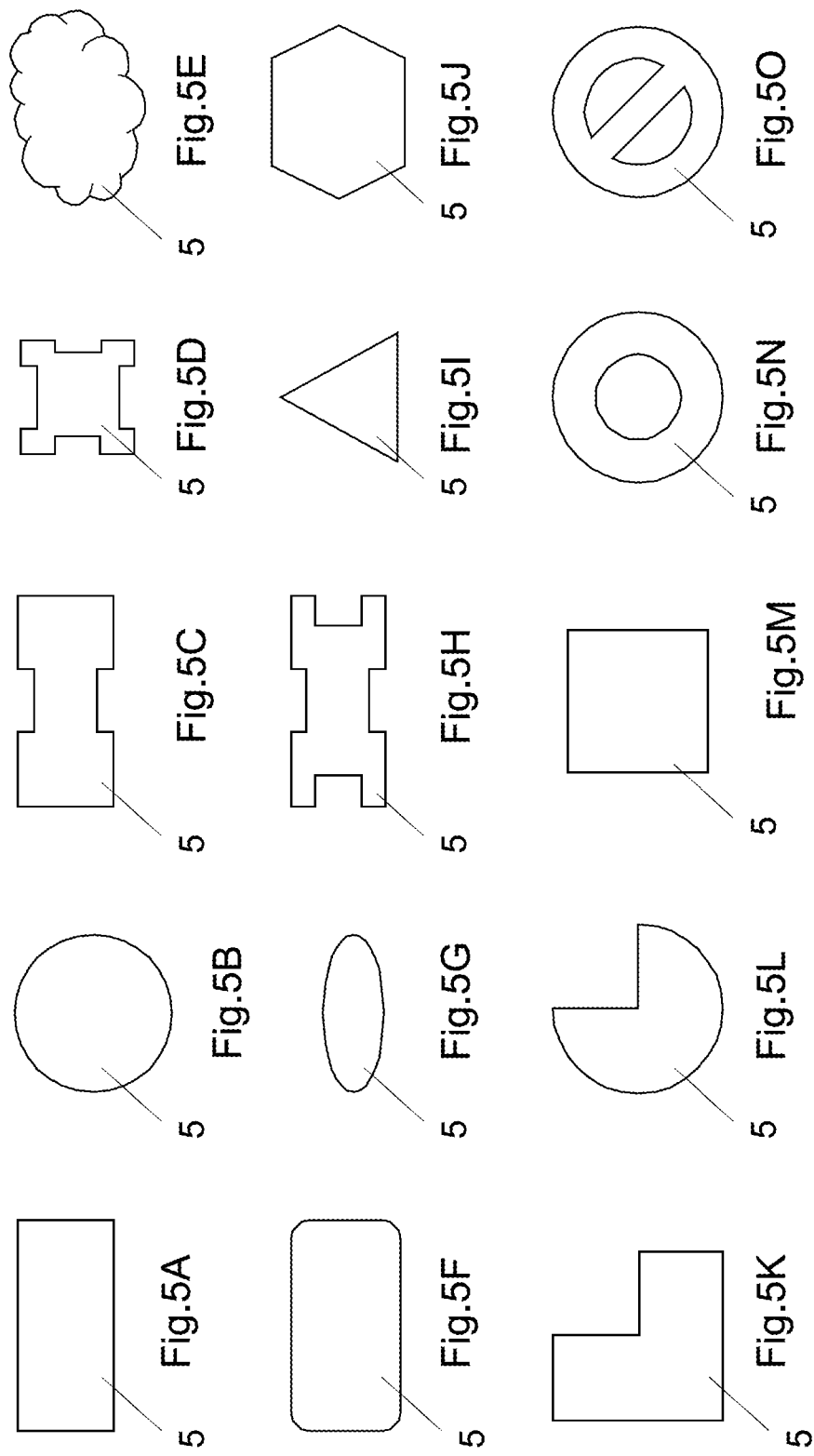

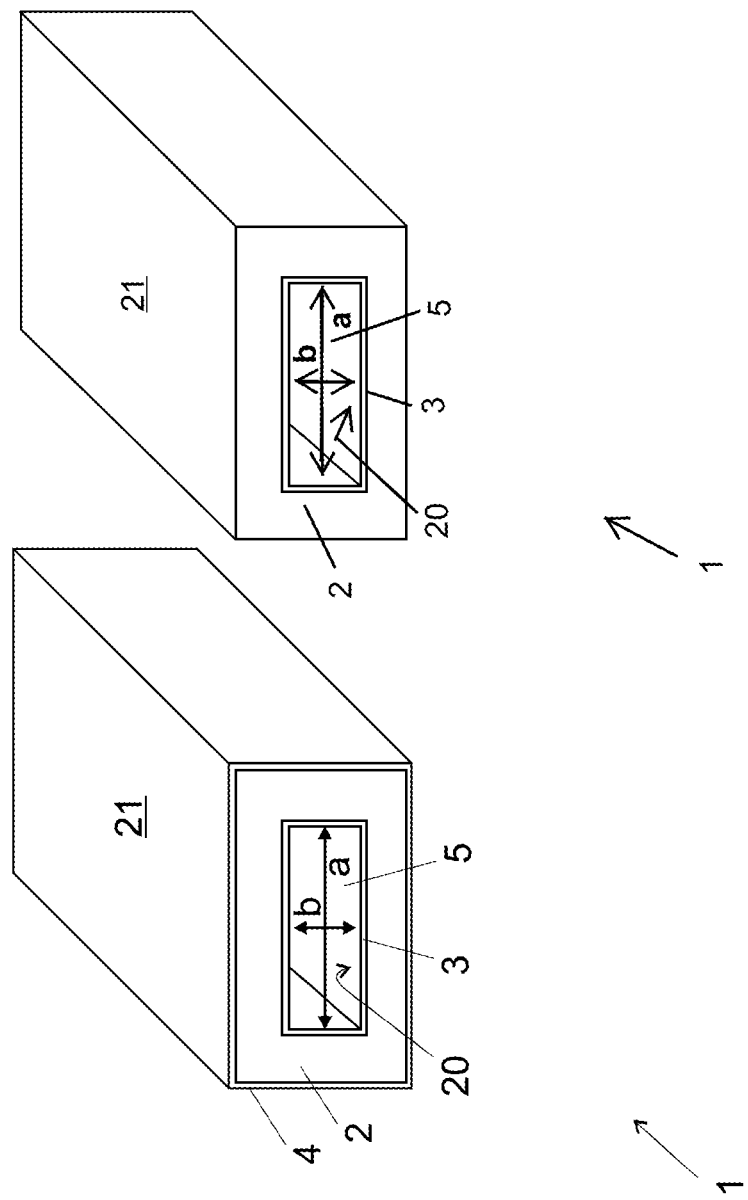

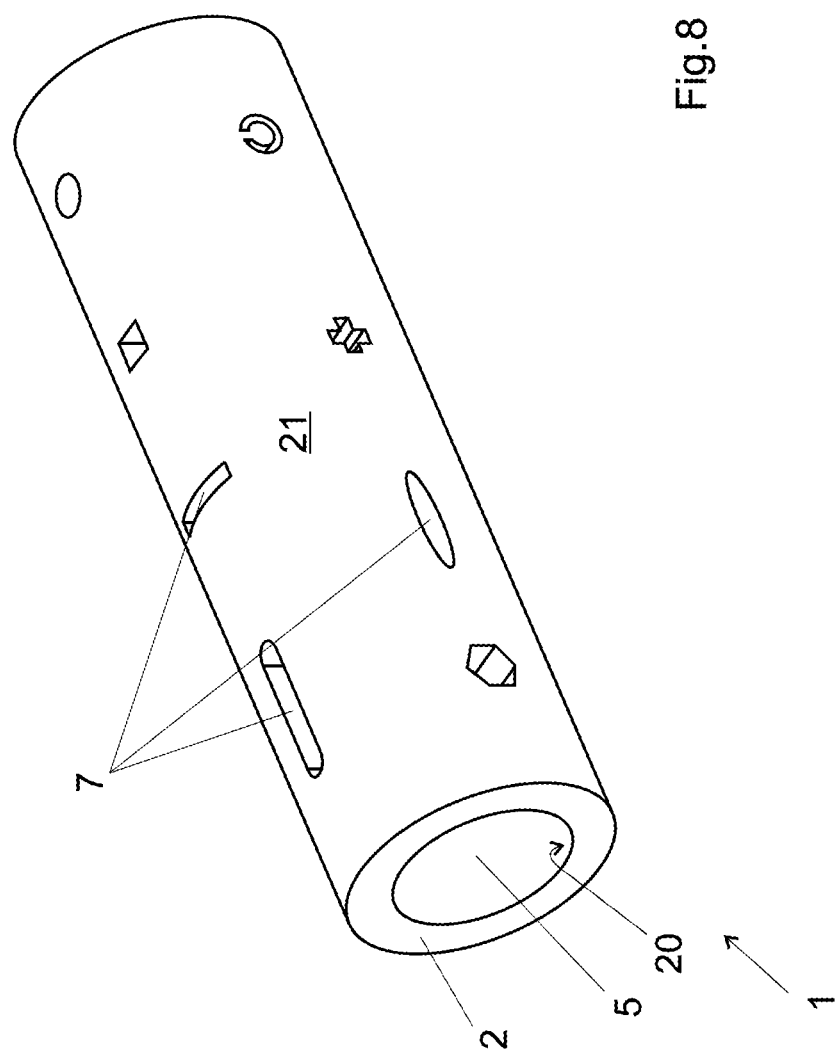

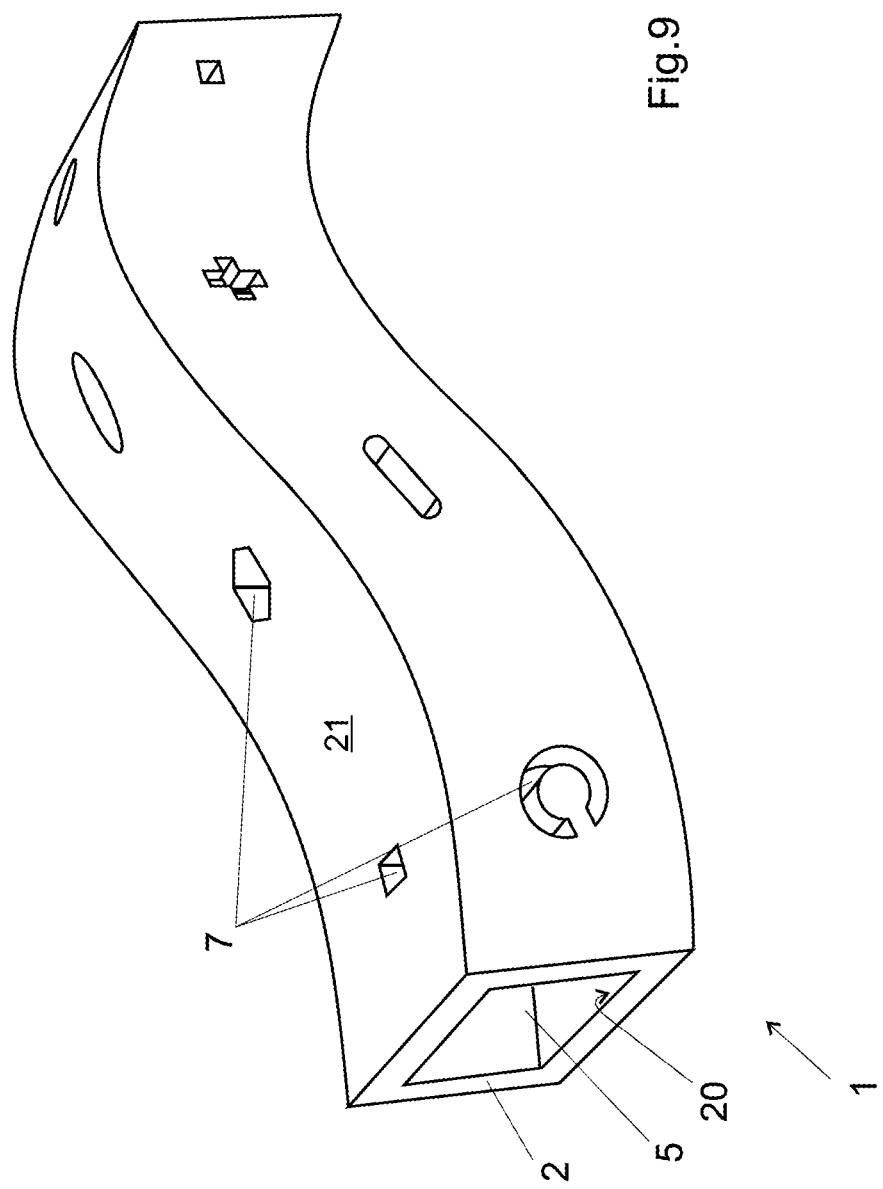

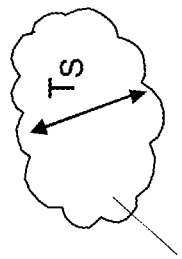
Fig. 10E
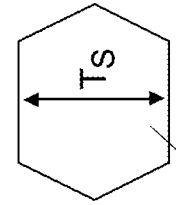
Fig. 10J
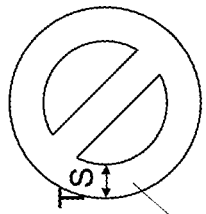
Fig. 10O
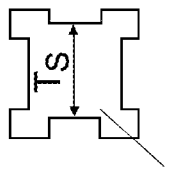
Fig. 10D
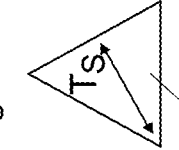
Fig. 10I
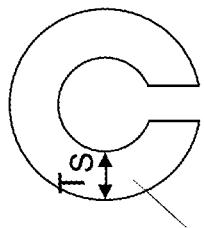
Fig. 10N
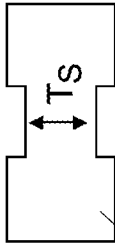
Fig. 10C
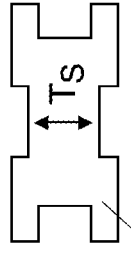
Fig. 10H
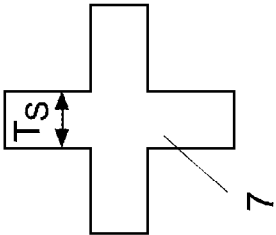
Fig. 10Q
Fig. 10B
Fig. 10G
Fig. 10M
Fig. 10A
Fig. 10F
Fig. 10L
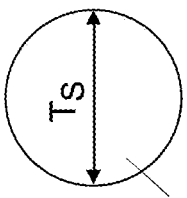
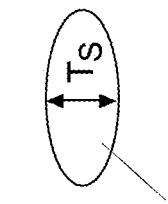
Fig. 10K
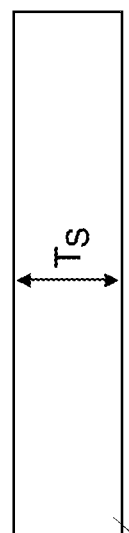
Fig. 10P

METHOD OF ADDITIVE MANUFACTURE OF A WAVEGUIDE AS WELL AS WAVEGUIDE DEVICES MANUFACTURED ACCORDING TO THIS METHOD

RELATED APPLICATIONS

This application claims priority of French patent application FR16/00370, filed on Mar. 4, 2016, the contents of which is hereby incorporated by reference.

TECHNICAL FIELD

The present invention relates to a method for the additive manufacturing of a waveguide device and a waveguide manufactured according to this method.

STATE OF THE ART

Radio Frequency (RF) signals can propagate either in a space or in waveguide devices. These waveguide devices are used to channel the RF signals or to manipulate them in the spatial or frequency domain.

The present invention relates in particular to passive RF devices that make it possible to propagate and manipulate radio frequency signals without the use of active electronic components. Passive waveguides can be divided into three distinct categories:

- Devices based on waveguiding inside hollow metal channels, commonly called waveguides.
- Devices based on waveguiding inside dielectric substrates.
- Devices based on waveguiding by means of surface waves on metal substrates such as PCB (printed circuit boards), microstrips, etc.

The present invention relates in particular to the first category above, collectively referred to hereinafter as waveguides. Examples of such devices include waveguides per se, filters, antennas, mode converters, and so on. They can be used for signal routing, frequency filtering, signal separation or recombination, transmission or reception of signals in or from free space, etc.

An example of a conventional waveguide is illustrated in FIG. 1. It consists of a hollow device whose shape and proportions determine the propagation characteristics for a given wavelength of the electromagnetic signal. Conventional waveguides used for radiofrequency signals have internal openings of rectangular or circular section. They propagate electromagnetic modes corresponding to different electromagnetic field distributions along their section. In the example illustrated, the waveguide has a height b along the axis y and a width a along the axis z.

FIG. 2 illustrates schematically the electric field lines E and magnetic field lines H in such a waveguide. The dominant propagation mode in this case is the electrical transverse mode called $TE_{10}$. The index 1 indicates the number of half-wavelengths across the width of the guide, and 0 the number of half-wavelengths along the height.

FIGS. 3 and 4 illustrate a waveguide with a circular section. Circular transmission modes can propagate in such a waveguide. The arrows in FIG. 4 illustrate the transmission mode $TE_{11}$; the substantially vertical arrows show the electric field, the more horizontal arrows the magnetic field. The orientation of the field changes through the section of the waveguide.

Apart from these examples of rectangular or circular waveguide openings, other opening shapes have been conceived or can be conceived within the scope of the invention and which allow one or more electromagnetic mode(s) to be maintained at a given signal frequency in order to transmit an electromagnetic signal. Examples of possible waveguide openings are illustrated in FIG. 5. The illustrated surface corresponds to the section of the opening of the waveguide, delimited by electrically conductive surfaces. The shape and surface of the section may further vary along the main direction of the waveguide device.

Manufacturing waveguides with complex sections is difficult and expensive. In order to remedy this, patent application US2012/0084968 proposes to make waveguides by 3D printing. For this purpose, a non-conductive plastic core is printed by an additive method and then covered with a metallic coating by electro-deposition. The inner surfaces of the waveguide must indeed be electrically conductive to operate. The use of a non-conductive core allows on the one hand to reduce the weight and the cost of the device, on the other hand to implement 3D printing methods suitable for polymers or ceramics and for producing high-precision parts with low wall roughness. The parts described in this document have complex shapes and comprise on the one hand a channel for the propagation of the wave, and on the other hand fastening holes on a foot of the waveguide, in order to fasten it to another element.

An example of a waveguide 1 which could be produced by additive manufacturing is illustrated in FIG. 6. It comprises a non-conductive core 2, for example made of polymer or ceramic, which is manufactured for example by stereolithography or by another additive method and which defines an internal opening 5 for propagation of the RF signal. In this example, the window has a rectangular section of width a and height b. The inner walls of this core around the opening 5 are coated with an electrically conductive coating 3, for example a metal veneer. In this example, the outer walls of the waveguide are also coated with a metal plating 4 which may be of the same metal and have the same thickness. This outer coating strengthens the waveguide against external mechanical or chemical stresses.

FIG. 7 illustrates an alternative waveguide similar to that of FIG. 6, but without the conductive coating on the outer faces.

Various techniques can be implemented for the deposition of the metal coating on the inner and possibly outer faces of the core. However, the problem is complex because of the small size of the opening, the complex shapes that it is often necessary to cover, and the need to control with great precision the dimensions of the opening and therefore the thickness of the coating.

Electro-deposition methods have for example been implemented, based on the use of an electric current between a cathode on the face to be covered and an anode immersed in a liquid filled with metal ions. By way of example, Yiley Huang et al., In "Layer-by-Layer stereolithography of three-dimensional antennas", presented at the "Antennas and propagation society symposium", 2005, IEEE Washington, D.C., Jul. 3-8, 2005, vol. 1 A, page 276, ISBN: 978-0-7803-8883-3, describe a method of metal electro-deposition on a microwave component made by stereolithography. Since the core is non-conductive, this method requires the deposition of an intermediate conductive layer that can serve as a cathode. The deposition of this intermediate layer is difficult; in this publication, it is in the form of a conductive ink of about 50 microns. The publication does not describe how to deposit a uniform layer of ink and electrodeposited metal in hard-to-reach places, for example in the middle of a long and narrow channel. The electrical connection of the portions of the cathode that are difficult to reach within the waveguide is also problematic.

For this reason, chemical deposition methods, without electric current, are sometimes preferred. They implement the immersion of the part to be plated successively in one or more baths containing reagents which trigger chemical reactions resulting in the deposition of the chosen metallic material, for example copper, gold, silver, nickel, etc., on the surface to be covered.

The efficiency and dynamics of deposition depend on many factors, including the concentration of reagents and metal ions in different baths near the surfaces to be coated.

However, tests carried out in the context of this invention have shown that the chemical deposition, without electrical current, of conductive metal on the walls of waveguide channels of complex shape has, however, at least two difficulties:

First, the frequent presence of trapped air bubbles in the waveguide channel often causes insufficient plating, or even a complete lack of plating, on some surfaces. The air bubbles prevent any contact between the reactive agents of the liquid and certain portions of the surface to be covered. The bubbles in the middle of the channel, at a distance from the ends, have particular difficulties in leaving it.

Then, the liquid reactants tend to stagnate in the channels of the waveguide. The chemical deposition reaction then rapidly consumes all the reagents of the stagnant liquid in the channels. When all the reagents have been consumed, the deposition reaction stops by leaving the waveguide channels with plating defects or plating of insufficient and irregular thickness. These defects are particularly important in the case of channels of great length and small section; in this case, the middle of the channel is particularly likely to let the reagents stagnate during the deposition, and to be less well covered.

Document US2012/0084968 already cited remedies this disadvantage by making long and narrow channels with metallized half-shells then assembled together. The manufacture of a channel using half-shells is however longer, since it requires an additional assembly step, and the result is of lower quality, since the slot between the two half-shells can disturb the signal transmission.

BRIEF SUMMARY OF THE INVENTION

An aim of the present invention is to provide a method for manufacturing a waveguide device which is free from the above limitations.

Another aim of the invention is to provide a waveguide device manufactured according to this method and which is free from the limitations of the above waveguide devices.

According to the invention, these aims are attained in particular by means of a waveguide device manufacturing method comprising the following steps:
  making a core of conductive or non-conductive material, said core having sidewalls with outer and inner surfaces, the inner surfaces defining a waveguide channel;
  depositing a layer of conductive metal on the inner surfaces by immersion in a reagent fluid;
  said core having at least one hole between said outer and inner surfaces of the sidewalls, specifically intended to promote the evacuation of bubbles in said channel and the flow of the fluid during said immersion.

Waveguide device is understood in the present application to mean any device comprising a hollow channel delimited by conducting walls and for guiding RF electromagnetic waves in the channel, for example for the transmission of an electromagnetic signal at a distance, filtering, transmission and emission in ether (antennas), mode conversion, signal separation, signal recombination, etc.

The invention relates in particular to devices capable of operating in the frequency bands L, S, C, X, Ku, K, Ka, Q, V, W, F, D or G.

The hole or holes allow a more even conductive metal deposition by preventing the accumulation of bubbles in the channel, and allowing improved fluid exchange between the inside and the outside of the waveguide during deposition.

The holes are particularly useful for preventing reagent stagnation near the middle of a long waveguide channel of small section, and for allowing any bubbles to leave this portion of the channel.

The sidewalls surrounding the waveguide channel are preferably metallized in a single operation. This avoids the presence of slots between the assembled walls after metallization.

For this purpose, the holes are advantageously provided in the sidewalls of a waveguide channel manufactured by an additive process. The metal layer is electroplated on all inner surfaces of the closed channel.

If, as a thought experiment, the waveguide channel is divided in three longitudinal sections of the same length, at least one hole will advantageously be provided in the intermediate section.

The section of the channel is much larger than that of the hole or holes, which disturb therefore only little the radio frequency performance, for example the waveguide's transmission efficiency.

The hole or holes preferably extend perpendicular to the walls through which they pass.

The hole or holes preferably extend perpendicular to the main direction of the channel.

The manufacture of the core may comprise an additive manufacturing step, for example a stereolithography manufacturing step.

The term "additive manufacturing" describes any process for the manufacture of parts by the addition of material, according to computer data stored on a computer medium and defining a model of the part. In addition to stereolithography, the term also refers to other manufacturing methods by curing or coagulation of liquid or powder including, but not limited to, ink jet methods (binder jetting), DED (Direct Energy Deposition), EBFF (Electron beam freeform fabrication), FDM (fused deposition modeling), PFF (plastic free-forming), aerosol, BIP (ballistic particle manufacturing), powder bed, SLS (Selective Laser Sintering), ALM (additive Layer Manufacturing), polyjet, EBM (electron beam melting), photo-polymerization, etc.

The method may include a step of surface treatment of the core to promote the attachment of the conductive metal layer. The surface treatment may comprise an increase in the surface roughness and/or the deposition of an intermediate bonding layer.

The additive manufacturing step can generate a core that already includes the one or more holes. The shape and location of the holes are therefore defined by the computer file used for additive printing of the core.

In a variant, the hole or holes are drilled after the additive manufacturing step. This variant, however, involves an additional step.

The edges of the hole may be metallized during the deposition step.

The holes can be closed again after metallization, for example by inserting a pin or infilling a conductive glue.

The outer faces of the device may be metallized during the deposition step. The device is thus more mechanically rigid and protected from mechanical and chemical attacks from the outside.

The conductive metal deposition is preferably performed by a chemical process without the use of electric current.

The invention also relates to a waveguide device produced by this method and comprising:
- a core of non-conductive material, said core having sidewalls with outer and inner surfaces, the inner surfaces defining a waveguide channel;
- a conductive metal layer on the inner surfaces;
- at least one hole between said outer and inner surfaces.

BRIEF DESCRIPTION OF THE FIGURES

Examples of implementation of the invention are indicated in the description illustrated by the appended figures in which:

FIGS. 5A through 5O illustrate different possible sections of transmission channels in waveguide devices.

FIGS. 6A and 6B illustrates a truncated perspective view of a rectangular-section waveguide device produced by additive manufacturing and whose inner and outer walls are both covered with electrically conductive material deposition.

FIG. 8 illustrates a perspective view of a rectangular-section waveguide device produced by additive manufacturing and whose inner walls are pierced with holes for the evacuation of bubbles and the circulation of fluid during the deposition.

FIG. 9 illustrates a perspective view of a circular-section waveguide device produced by additive manufacturing and whose inner walls are pierced with holes for the evacuation of bubbles and the circulation of fluid during the deposition.

FIGS. 10A through 10Q illustrate different possible sections of through-holes in waveguide devices, showing the typical dimension Ts to consider for each section.

EXAMPLE(S) OF EMBODIMENTS OF THE INVENTION

Figure 2:
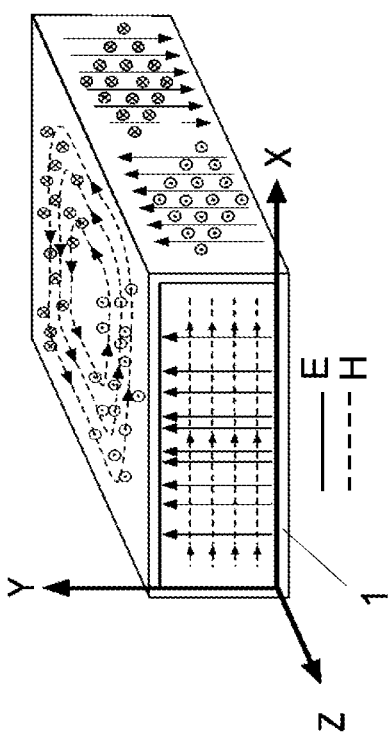
FIG. 2 illustrates the magnetic and electrical field lines in the device of FIG. 1.
Figure 1:
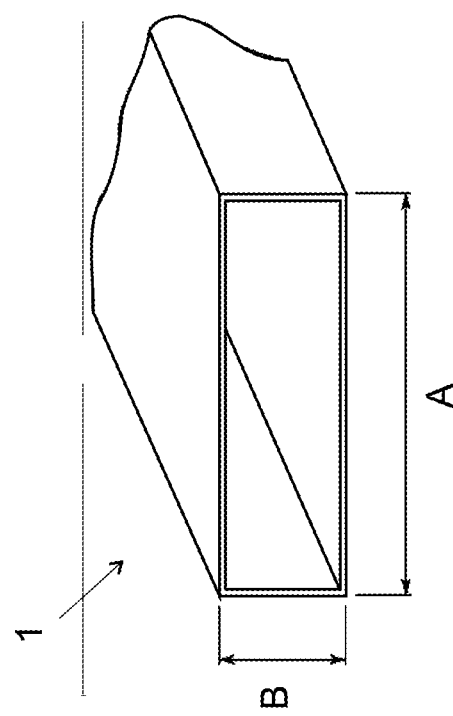
FIG. 1 illustrates a truncated perspective view of a conventional waveguide device having a rectangular section.
Figure 4:
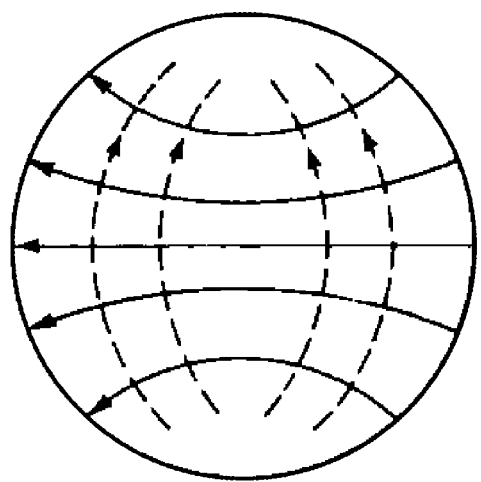
FIG. 4 illustrates the magnetic and electrical field lines in the device of FIG. 3.
Figure 3:
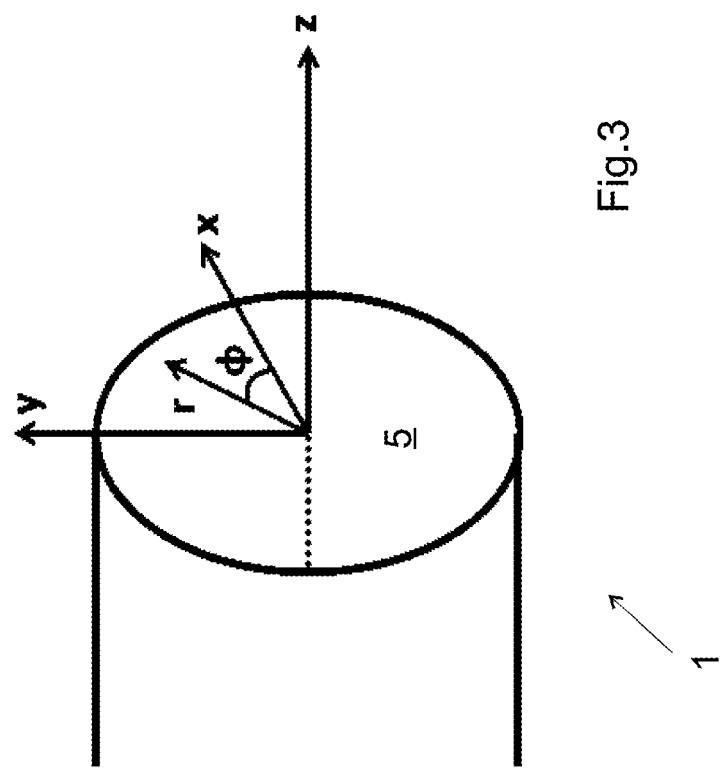
FIG. 3 illustrates a truncated perspective view of a conventional waveguide device having a circular section.
Figure 7:
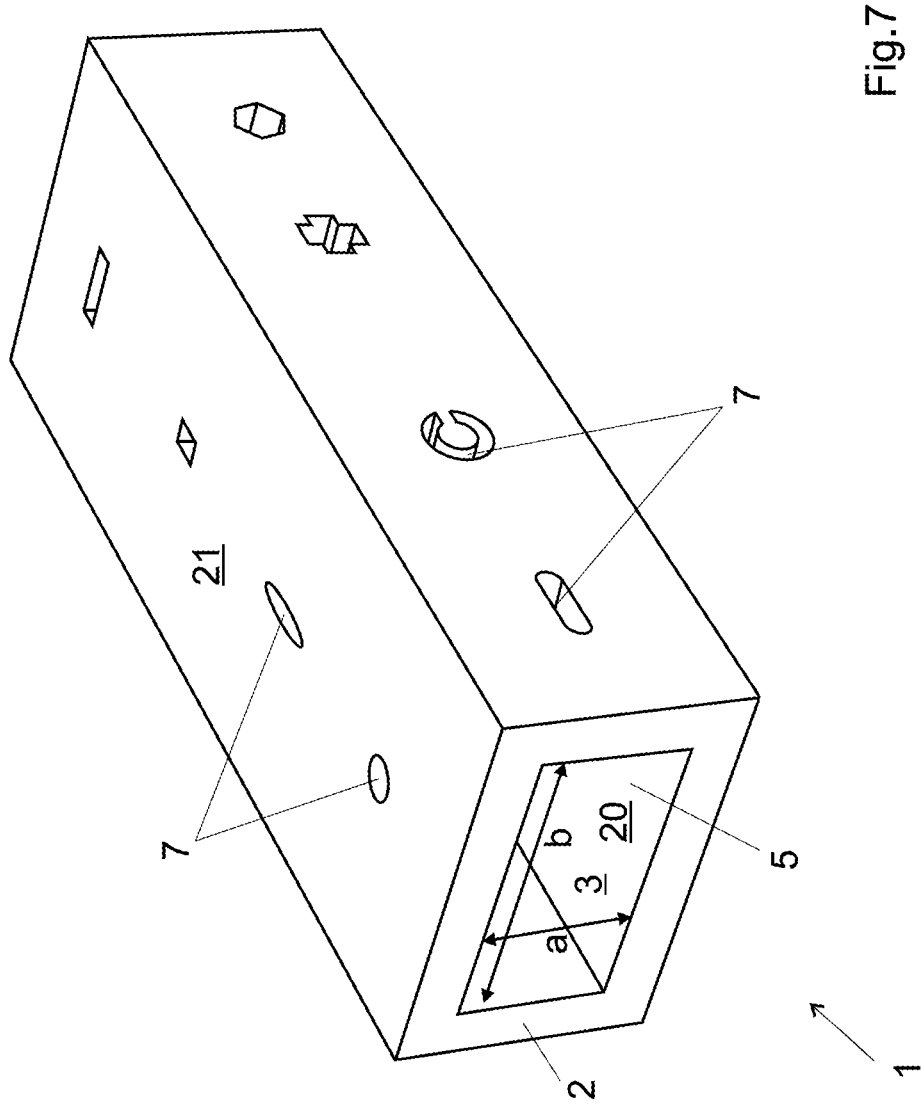
FIG. 7 illustrates a truncated perspective view of a rectangular-section waveguide device produced by additive manufacturing and of which only the inner walls are covered with electrically conductive material deposition.

FIG. 7 illustrates a perspective view of a waveguide device 1 according to the invention, in this case a waveguide device having a rectangular section. It comprises a core 2 of non-conductive material, for example of polymer such as epoxy, or ceramic, manufactured by additive manufacturing, for example by stereolithography. This core delimits an internal channel 5 designed for waveguiding, and whose section is determined according to the frequency of the electromagnetic signal to transmit. The dimensions of this internal channel a, b and its shape are determined as a function of the operating frequency of the device 1, i.e. the frequency of the electromagnetic signal for which the device is manufactured and for which a transmission mode that is stable and optionally has a minimum of attenuation is obtained.

The core 5 is made monolithically, for example by stereolithography. It may also consist of several parts formed by stereolithography and assembled together before plating, for example by gluing or thermal fusion.

The inner surfaces 20 of the core 2 delimit the channel 5. They are covered with a deposition of conductive material (not represented), for example copper, silver, gold, nickel, etc., plated by chemical deposition without electric current.

The thickness of this conductive coating must be sufficient for the surface to be electrically conductive at the chosen radio frequency. This is typically achieved using a conductive layer deposited on the inner walls of the waveguide with a thickness at least equal to the skin depth δ:

$$\delta = \sqrt{\frac{2}{\mu 2\pi f \sigma}}$$

where μ is the magnetic permeability of the plated metal, f is the radio frequency of the signal to be transmitted and σ is the electrical conductivity of the plated metal.

This thickness is substantially constant on all inner surfaces 20 to obtain a finished part with precise dimensional tolerances for the channel 5. The thickness is preferably greater than 1 μm.

The outer surfaces 21 around the core 2 may also be covered with a deposition of the same material, of another material, or be bare.

The deposition of conductive metal 3 on the inner faces 20 and possibly outer faces 21 is done by immersing the core 5 in a series of successive baths, typically 5 to 15 baths. Each bath involves a fluid with one or more reagents. The deposition does not require applying a current on the core to be covered. Stirring and regular deposition are obtained by stirring the fluid, for example by pumping the fluid in the transmission channel 5 and/or around the device or by vibrating the core 5 and/or the fluid tank, for example with an ultrasonic vibrating device for creating ultrasonic waves.

According to one aspect of the invention, one or more through-holes 7 pass through the core 2 between the inner and outer surfaces 21, so as to allow fluid communication between the channel 5 and the environment around the device 1. In the example illustrated in this figure, several holes of variable section are provided on the large wall of internal width b and several holes 7 of variable section are also provided on the small wall of height a. However, it is also possible to provide holes only on the large wall, or only on the small wall, or on any number of walls. It is possible to provide 0, 1 or N holes on each wall. The cross-section of the through-holes 7 and their shape may be identical or variable.

FIG. 8 illustrates an alternative waveguide device 1 with an internal guide channel 5 having a circular section and provided with through-holes 7 for fluid exchange between the channel 5 and the outside during immersion.

FIG. 9 illustrates an alternative waveguide device 1 with an internal guide channel 5 having a rectangular section, the channel 5 being however corrugated and not parallelepiped. It is also provided with through-holes 7 for the fluid exchange between the channel 5 and the outside during immersion.

The holes extend in all these examples perpendicular to the inner and outer surfaces 21 and perpendicular to the main direction along which the channel 5 extends. Holes oriented at an angle can also be made.

The size of the holes 7, their shape, their orientation, their spacing, their distribution on the inner and outer surfaces, their number and their density affect in particular the following characteristics:
 Efficiency of the fluid exchange from and to the channel 5 during the deposition of the conductive surfaces on the core 2.
 Effectiveness of the evacuation of bubbles out of the channel 5 during this deposition step.
 Performance of the waveguide device, e.g. attenuation of the transmitted signal or other signal disturbances caused by the holes.

Figure 11:
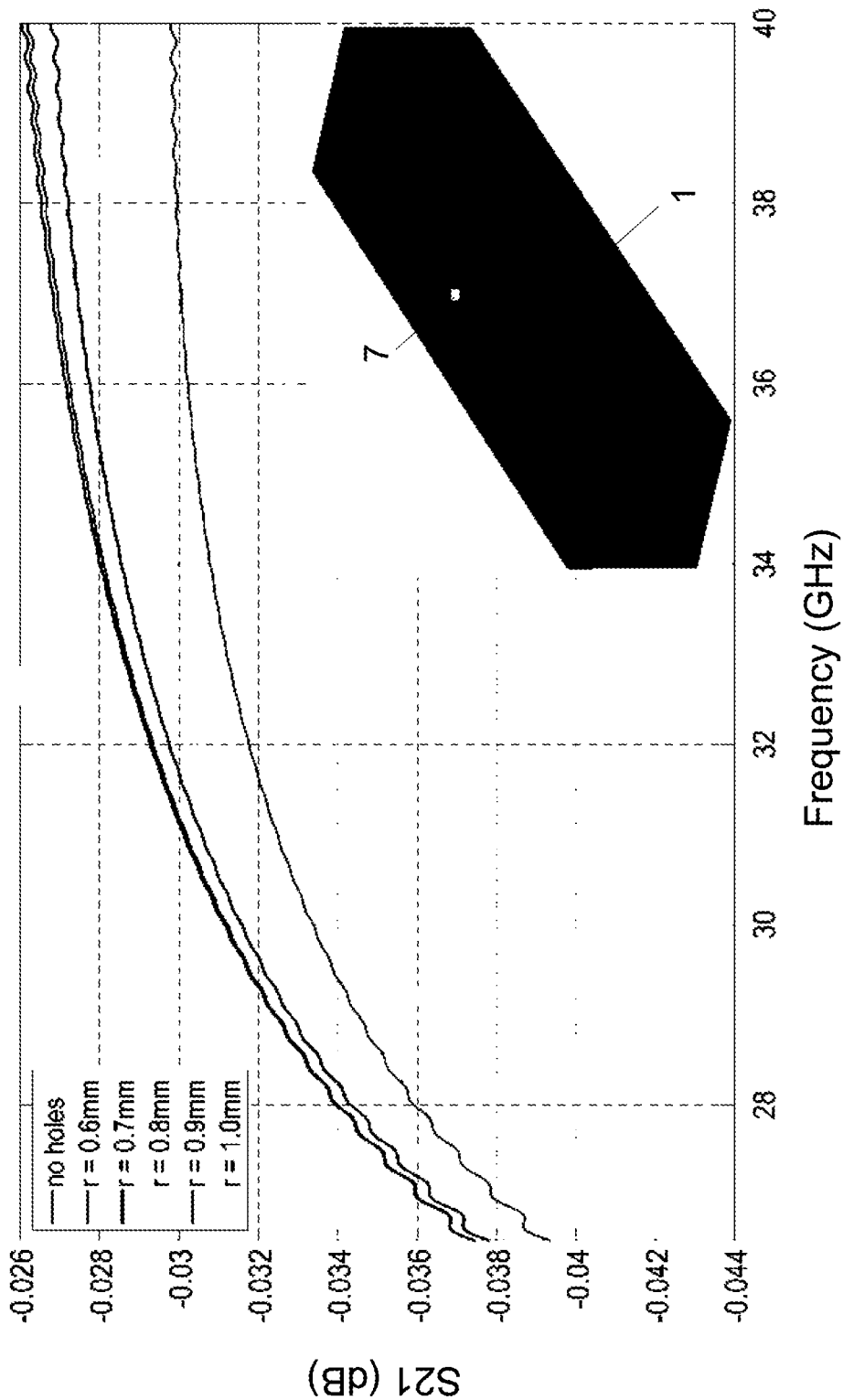
FIG. 11 is a diagram which illustrates the decibel attenuation produced by a single hole of variable diameter in a large wall of a rectangular-section waveguide device, according to the transmission frequency and the hole diameter.

FIG. 11 illustrates the decibel attenuation of the RF signal produced by a single circular-section hole 7 that is 50 mm long, the hole being provided through one of the large walls of a rectangular-section waveguide device, for different transmission frequencies. The different curves correspond to holes 7 with different diameters. In FIG. 11, which shows an example of a Ka-band waveguide, it can be seen that the attenuation is negligible for a 0.6 and 0.7 mm diameter hole, but that it increases more rapidly beyond that. Absolute values depend on the type of waveguide device and its dimensions. The diagram shows however that the use of holes of sufficient size for the purpose described can be considered without affecting the operation of the device.

Figure 12:
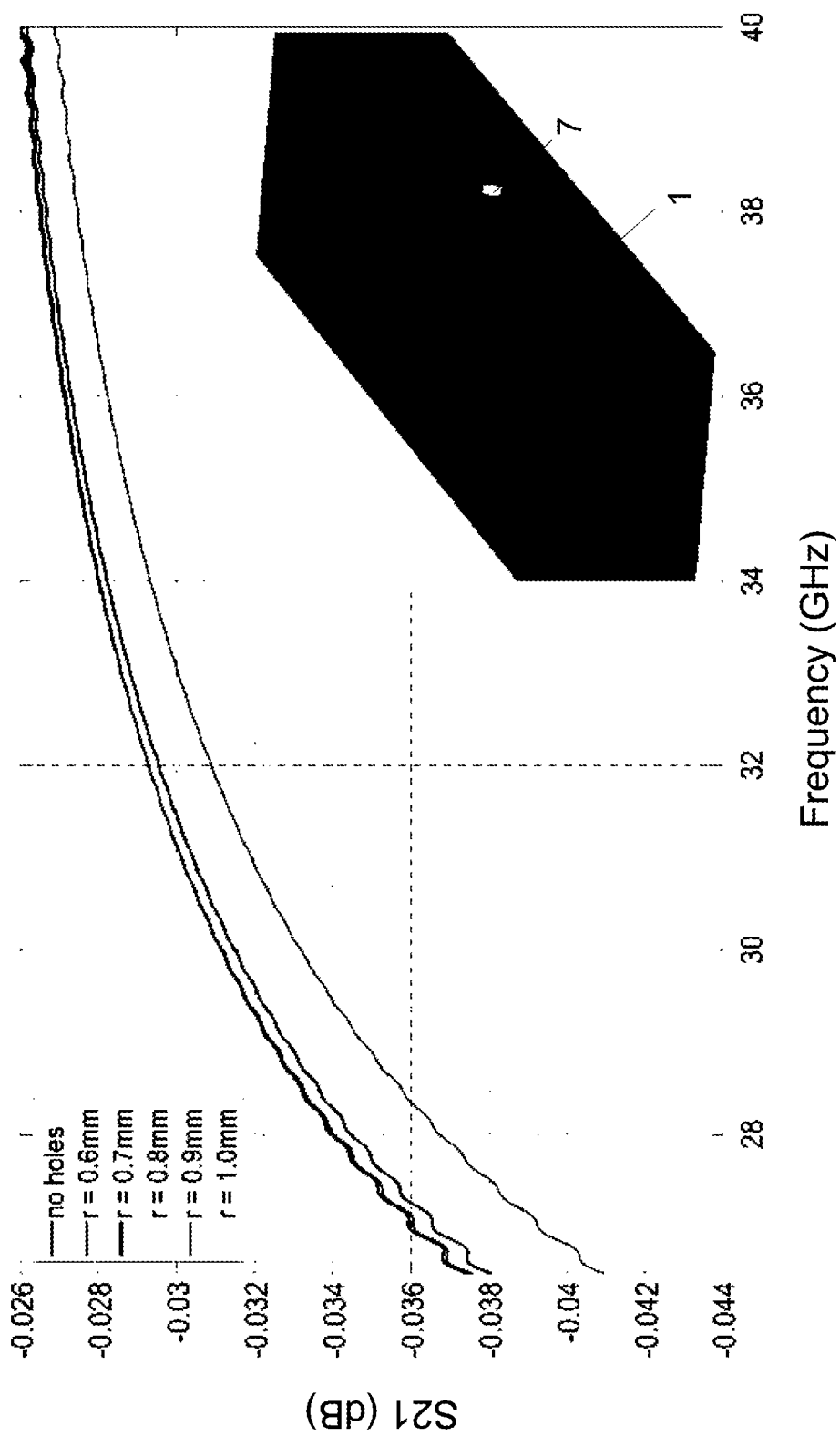
FIG. 12 is a diagram illustrating the decibel attenuation produced by a single variable-diameter hole in a small wall of a rectangular-section waveguide device, depending on the transmission frequency and the hole diameter.

FIG. 12 illustrates the decibel attenuation of the RF signal produced by a single hole 7 identical to that of FIG. 11, but provided through one of the small walls of the same waveguide device. The different curves correspond to different diameters of the holes 7. It can be seen that the attenuation also increases with the diameter of the hole, but remains smaller than when the hole is provided in one of the large walls of width b. This simulation suggests that it is generally preferable to provide holes (possibly through-holes) on the small walls of the waveguide device, at least in the case of rectangular-section devices in the $TE_{10}$ transmission mode.

Figure 13:
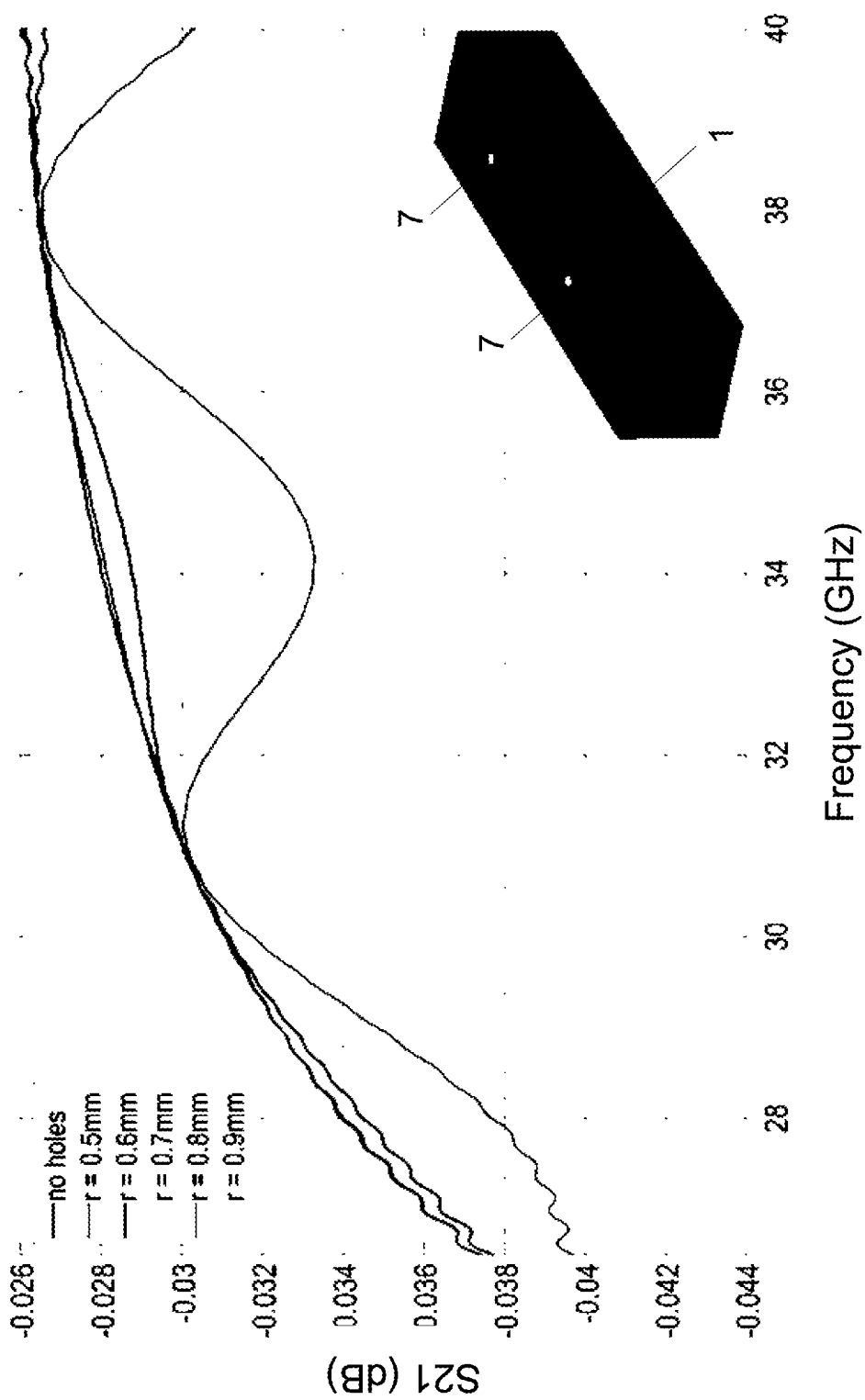
FIG. 13 is a diagram illustrating the decibel attenuation produced by two variable-diameter holes in a large wall of a rectangular-section waveguide device, depending on the transmission frequency and the hole diameter.

FIG. 13 illustrates the decibel attenuation of the RF signal produced by two holes 7 in a device identical to that of FIG. 11, the holes being provided through one of the large waveguide walls. The different curves correspond to different diameters of the holes 7. Again, the attenuation of the electromagnetic signal generally tends to increase with the diameter of the hole. However, it is also highly dependent on the frequency, which suggests a disturbance of the transmission mode at certain frequencies.

In general, the dimensions of the holes 7 between the inner and outer walls 20, 21 affect the radiofrequency performance of the device. This performance degradation is however acceptable if the typical dimension of the holes Ts is less than one third of the wavelength $\lambda$ in the free space at the operating frequency of the device:

$$Ts < \lambda/3$$

In a preferred embodiment, the typical dimension of the holes Ts is less than one fifth of Ts.

Various possible sections for through-holes 7 are illustrated in FIG. 10 which also shows the typical dimension Ts to be considered for each shape. In the case of a rectangular-section channel 5, the typical dimension is the height b (i.e. the dimension perpendicular to the main direction of the channel of the smaller wall). In the case of a channel 5 with a circular section, the typical dimension Ts is constituted by the diameter. Other typical dimensions are illustrated in FIG. 10.

Figure 14:
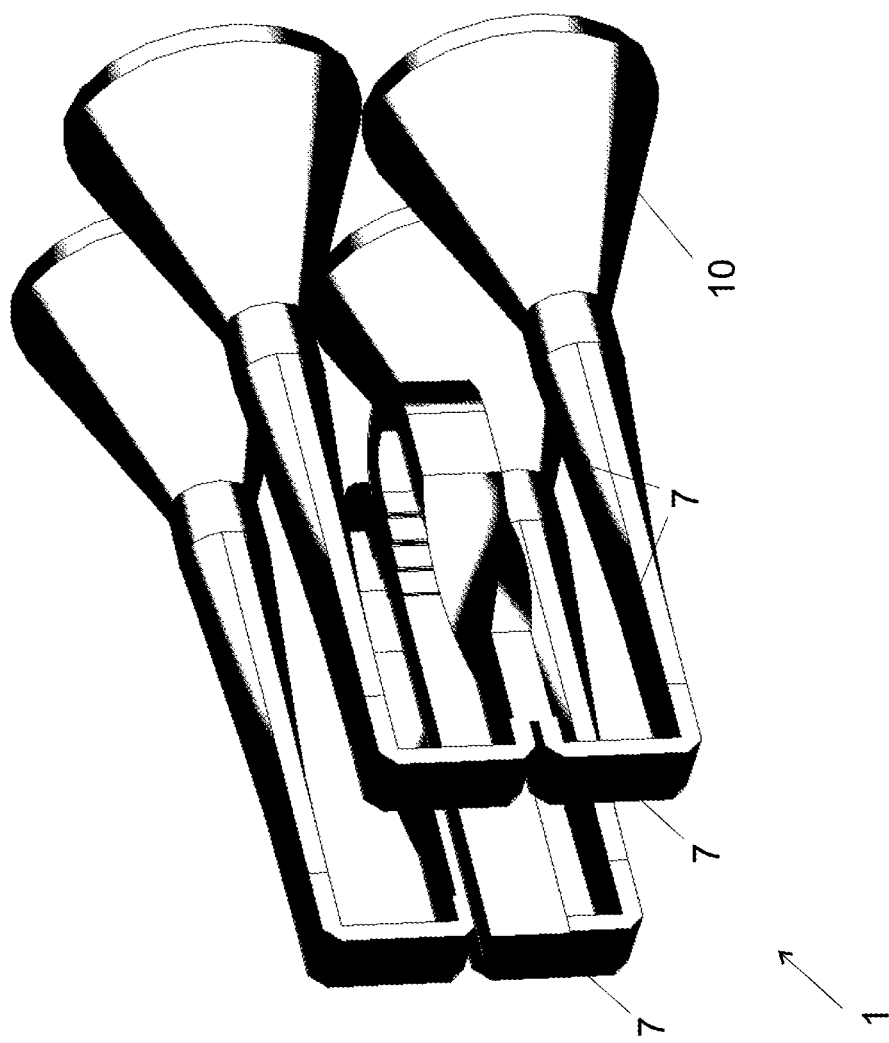
FIG. 14 illustrates schematically an exemplary waveguide device that can be manufactured with the method of the invention.

FIG. 14 schematically illustrates an exemplary waveguide device 1 which can be manufactured with the method of the invention. In this non-limiting example, it is an antenna array comprising funnels 10 and transmission sections forming a beam-forming network. All inner surfaces must be metallized, i.e. covered by metal deposition. The core 5 is manufactured by additive manufacturing, for example by stereolithography, in a polymer or a ceramic, or a combination of both. The device 1 has holes 7 which can be obtained directly by the additive manufacturing process, or, for some of them, drilled afterwards.

The invention also relates to a manufacturing method comprising:
 inputting data into a computer representing the shape of a core 2 of a waveguide device as described above;
 the use of these data to achieve, by additive manufacturing, a waveguide device core.

Furthermore, the invention also relates to a computer data medium containing data to be read by an additive manufacturing device for manufacturing an object, said data representing the shape of a core for a waveguide device 1, said core having sidewalls with outer surfaces 21 and inner surfaces 20, the inner surfaces defining a waveguide channel 5; said core having at least one hole 7 between said outer and inner surfaces.

The computer data medium can be constituted for example by a hard disk, a flash memory, a virtual disk, a USB key, an optical disk, a storage medium in a network or of cloud type, etc.

What is claimed is:

1. Method of manufacturing a waveguide device comprising the steps of:
 making a core having sidewalls with outer and inner surfaces, the inner surfaces defining a waveguide channel, wherein the core has at least one hole formed in the sidewalls between said outer and inner surfaces of the sidewalls; and
 depositing a layer of conductive metal on the inner surfaces of the core by immersion of the core in a reagent fluid, wherein the reagent fluid is supplied to the waveguide channel through the at least one hole to promote the evacuation of bubbles in the waveguide channel and/or the flow of the reagent fluid to the waveguide channel during said immersion.

2. The method of claim 1, said channel having a larger section than said hole.

3. Method according to claim 2, the typical dimension of the hole or holes being less than one third of the wavelength in the free space at the operating frequency of the device.

4. Method according to claim 2, the typical dimension of the hole or holes being less than 2 millimeters.

5. Method according to claim 1, the hole or holes extending perpendicular to said walls and to the main direction of the channel.

6. Method according to claim 1, the manufacture of said core comprising an additive manufacturing step.

7. Method according to claim 6, the manufacture of said core being carried out by stereolithography.

8. Method according to claim 6, comprising a surface treatment step of said core in order to promote the bonding of the conductive metal layer.

9. Method according to claim 6, the conductive metal deposition being carried out by a chemical process without the use of electric current.

10. Method according to claim 6, said additive manufacturing step producing a core which includes the hole or holes.

11. Method according to claim 6, said hole being pierced after said additive manufacturing step.

12. Method according to claim 1, said core having a plurality of said holes between the inner and outer walls, the diameter of each hole being less than 1 mm.

13. Method according to claim 1, the deposition comprising a step of pumping fluid through said at least one said hole.

* * * * *